United States Patent
Wilson et al.

(10) Patent No.: US 6,504,530 B1
(45) Date of Patent: Jan. 7, 2003

(54) TOUCH CONFIRMING TOUCHSCREEN UTILIZING PLURAL TOUCH SENSORS

(75) Inventors: Geoffrey D. Wilson, Oxnard, CA (US); Victor E. Borgnis, Fremont, CA (US); Joel Kent, Fremont, CA (US); Mike Lewis, Oakland, CA (US); Drew Loucks, San Jose, CA (US); James Roney, Fremont, CA (US); Michael Bruno Patti, San Francisco, CA (US)

(73) Assignee: ELO Touchsystems, Inc., Fremont, CA (US)

( * ) Notice: Subject to any disclaimer, the term of this patent is extended or adjusted under 35 U.S.C. 154(b) by 0 days.

(21) Appl. No.: 09/390,207

(22) Filed: Sep. 7, 1999

(51) Int. Cl.[7] .................................................. G09G 5/00
(52) U.S. Cl. ........................ 345/173; 345/174; 345/175; 345/177
(58) Field of Search ................................ 345/173, 168, 345/174, 175, 176, 177, 178, 179

(56) References Cited

U.S. PATENT DOCUMENTS

| 4,103,252 A | 7/1978 | Bobick |
| 4,145,748 A | 3/1979 | Eichelberger et al. |
| 4,264,903 A | 4/1981 | Bigelow |

(List continued on next page.)

FOREIGN PATENT DOCUMENTS

| DE | 93 16 194.8 | 3/1995 | ............ G06F/3/037 |
| EP | 0 372 964 A2 | 6/1990 | ............ G06K/11/08 |
| EP | 0 727 875 A1 | 8/1996 | |
| EP | 0 795 837 A1 | 9/1997 | ............ G06K/11/18 |
| GB | 2 295 017 A | 5/1996 | |
| WO | WO 88/05577 | 7/1988 | |
| WO | WO 95/27334 | 10/1995 | |
| WO | WO 96/15464 | 5/1996 | |

OTHER PUBLICATIONS

Patent Abstracts of Japan, vol. 017, No. 529 (P–1618), Sep. 22, 1993 & JP 05 143226 A (Sharp Corp), Jun. 11, 1993.
"Combining Laser and Piezoelectric Touchscreens", IBM Technical Disclosure Bulletin, vol. 31, No. 2 Jul. 1988, p. 137 XP–002168304, IBM Corp., New York.
PCT Search Report, PCT/US00/29784, filed Oct. 17, 2000.

Primary Examiner—Steven Saras
Assistant Examiner—William C. Spencer (57) ABSTRACT

A method and apparatus for discriminating against false touches in a touchscreen system is provided. The system is designed to confirm a touch registered by one touch sensor with another touch sensor, preferably of a different sensor type, prior to acting upon the touch (i.e., sending touch coordinates to the operating system). If the touch registered by the first touch sensor is not confirmed by the second touch sensor, the touch is invalidated. Thus the strengths of one type of sensor are used to overcome the deficiencies of another type of sensor. In one aspect, the secondary touch sensor comprises a force sensor to discriminate between true and false touches on other types of touch sensors, such as contaminants on optical and surface acoustic wave sensors, noise or weak signals on capacitive sensors, etc. The force sensor may be a simple one-element system that merely indicates that a touch has occurred or a multi-element system that can provide confirming or supplementary coordinate data. In another aspect, a capacitive sensor is used to confirm or veto touch data from optical, surface acoustic wave, and force sensors. As is the case with the secondary force sensor, a secondary capacitive sensor may be a simple discrete type or capable of providing touch coordinates in its own right. In a specific embodiment, one in which no touch overlay is used on a CRT monitor, the secondary touch sensor may employ the resistive coating on the surface of the CRT in combination with a current monitoring circuit that measures the amplitude of the electromagnetic noise signal coupled to the resistive coating. In this application when the screen is touched by a grounded object, the detected signal amplitude change exceeds a preset threshold thus indicating a valid touch.

8 Claims, 9 Drawing Sheets

U.S. PATENT DOCUMENTS

| | | |
|---|---|---|
| 4,644,100 A | 2/1987 | Brenner et al. |
| 4,686,332 A | 8/1987 | Greanias et al. |
| 4,700,176 A | 10/1987 | Adler |
| 4,778,951 A | 10/1988 | Pepper, Jr. et al. |
| RE33,151 E | 1/1990 | Adler |
| 4,924,222 A | 5/1990 | Antikidis et al. |
| 4,954,823 A | 9/1990 | Binstead |
| 5,117,071 A | 5/1992 | Greanias et al. |
| 5,231,381 A | 7/1993 | Duwaer |
| 5,270,711 A | 12/1993 | Knapp |
| 5,332,238 A | 7/1994 | Borucki |
| 5,510,813 A | 4/1996 | Makinwa |
| 5,543,589 A | 8/1996 | Buchana et al. |
| 5,650,597 A | 7/1997 | Redmayne |
| 5,670,755 A | 9/1997 | Kwon |
| 5,708,461 A | 1/1998 | Kent |
| 5,742,119 A | 4/1998 | Aben et al. |
| 5,777,607 A | 7/1998 | Koolen |
| 5,790,106 A | 8/1998 | Hirano et al. |
| 5,801,682 A | 9/1998 | Coni et al. |
| 5,844,506 A | 12/1998 | Binstead ................ 341/34 |
| 5,854,450 A | 12/1998 | Kent |
| 6,281,888 B1 * | 8/2001 | Hoffman et al. ............ 345/179 |
| 6,297,811 B1 | 10/2001 | Kent et al. ................ 345/173 |

* cited by examiner

TOUCH CONFIRMING TOUCHSCREEN UTILIZING PLURAL TOUCH SENSORS

TECHNICAL FIELD OF THE INVENTION

The present invention relates generally to touchscreens and, more particularly, to a method and apparatus for discriminating between a false touch event and a true touch on a touchscreen.

BACKGROUND OF THE INVENTION

Touchscreens are used in conjunction with a variety of display types, including cathode ray tubes (i.e., CRTs) and liquid crystal display screens (i.e., LCD screens), as a means of inputting information into a data processing system. When placed over a display or integrated into a display, the touchscreen allows a user to select a displayed icon or element by touching the screen in a location corresponding to the desired icon or element. Touchscreens have become common place in a variety of different applications including, for example, point-of-sale systems, information kiosks, automated teller machines (i.e., ATMs), data entry systems, etc.

A variety of touchscreen types have been developed. Unfortunately each type of touchscreen has at least one weakness limiting its usefulness in at least some applications. For example, the cover sheet in a resistive touchscreen is susceptible to damage. Even repeated screen compressions may eventually damage a resistive touchscreen. This type of touchscreen is also susceptible to environmental damage, for example moisture entering the display. A second type of touchscreen, capacitive touchscreens, are non-responsive to touch from an ungrounded object, thus leading to potential problems with gloved hands, styluses, pencils, etc. A third type of touchscreen utilizing surface acoustic waves is susceptible to the accumulation of contaminants (e.g., water) on the surface of the sensor. Contamination can also interfere with the operation of infrared touchscreens. A fifth type of touchscreen using force sensors is susceptible to shock and vibration.

Various systems have been designed that utilize two different touchscreen technologies for a variety of purposes, primarily as a means of accommodating different touch mechanisms, e.g., a finger and a stylus, for data entry.

U.S. Pat. No. 5,231,381 discloses a multi-purpose data input device utilizing an integrated touchscreen and a digitizing tablet. The touchscreen detects the presence and location of a passive input (e.g., finger touch) through any of a variety of techniques including surface acoustic wave, force, capacitive, or optical touch sensors. The digitizing tablet employs an active stylus mechanism to stimulate a capacitive, inductive, or surface acoustic wave sensor.

U.S. Pat. No. 5,510,813 discloses a touch panel that measures both touch position and touch force. The touch panel uses a resistive, conductive layer and determines touch position by monitoring the current pattern. The force of the touch is determined by monitoring a capacitance value between the touch panel and a second conductive panel that extends substantially parallel to the touch panel. In response to a touch, the system processes both the detected position and the detected force of the touch.

U.S. Pat. No. 5,543,589 discloses a dual sensor touchscreen in which each sensor determines touch position, but with a different resolution. The two sensors are sandwiched together to form a single sensor, thus allowing a single touch by a finger, stylus, etc. to be detected by both sensors. In use, the wide conductors of the low resolution sensor are first scanned in order to determine touch position to within a rectangular area the size of one wide conductor. To determine the touch location with the higher resolution sensor, only the narrow conductors corresponding to the rectangular area of touch determined with the low resolution sensor must be scanned. Thus the system disclosed is intended to reduce the number of scan drivers and receivers required, thus lowering cost as well as speeding up the scanning process.

U.S. Pat. No. 5,670,755 discloses a touch panel that can be used in either of two modes. In one mode, the touch panel operates like a conventional touchscreen, allowing a user to input information by touching the screen with a finger, pen, or other touching medium. In this mode two resistive layers applied to the panel come into contact at the point of touch. The determination of the contact location is based on resistance ratios. In a second mode, the touch panel functions as a digitizer using a specially designed stylus. Capacitance coupling at the contact point of the stylus to the panel is used in determining the contact point.

U.S. Pat. No. 5,777,607 discloses a system that senses finger touch capacitively and stylus touch resistively. In either touch mode the disclosed system is able to determine the x- and y-coordinates of the touch on the touchscreen using a single resistive layer. In the preferred embodiment, the finger detection mode is disabled when the system detects the stylus is in use, thus preventing the inadvertent input of data through capacitive coupling with the user's hand.

U.S. Pat. No. 5,801,682 discloses a dual sensor touchscreen in which the variations in coordinate data from a capacitive sensor are compensated for by the use of strain gauges mounted at the corners of the sensor. Variations in the capacitive sensor data may result from changes in signal path, for example, due to the user wearing gloves.

What is needed in the art is a method and apparatus for discriminating against false touches of the sort that may result from external stimuli such as vibration, electrical noise, and contaminants, or for confirming the presence of touch. The present invention provides such a method and apparatus.

SUMMARY OF THE INVENTION

The present invention provides a method and apparatus for discriminating against false touches in a touchscreen system. The system utilizes multiple touchscreen sensors of differing types to validate a touch on a touchscreen. Thus the invention utilizes the strengths of specific sensor types to overcome the deficiencies of other sensor types.

The basis of the invention lies in the ability to confirm a touch registered by one touch sensor with another touch sensor. If the touch is confirmed, the touch can be acted upon, for example by sending touch coordinates to the operating system. If, on the other hand, the touch is not confirmed, the touch is invalidated. The system can be designed such that there is a primary touch sensor that determines the touch coordinates and a secondary sensor that validates the presence of a touch, by either a discrete signal or by generating a second set of touch coordinates for comparison purposes. Furthermore, the touch coordinates can either be determined before or after the initial touch is confirmed.

In one embodiment of the invention, the secondary touch sensor comprises a force sensor to discriminate between true and false touches, false touches being caused by such factors as contaminants (e.g., problematic for optical and surface acoustic wave sensors), noise or weak signals (e.g., problematic for capacitive sensors), etc. In this embodiment, when the pressure that is applied to the touch screen exceeds a predetermined threshold, the touch coordinates are validated. In contrast, when a false touch signal is generated by the primary sensor, for example due to a raindrop falling on a surface acoustic wave sensor, the lack of a confirming touch pressure on the secondary force sensor causes the data to be declared invalid. The secondary force sensor may be a simple one-element system that merely indicates that a touch has occurred by sensing touch pressure, or a multi-element force touch system that can provide confirming or supplementary coordinate data.

In another embodiment, a capacitive sensor is used to confirm or veto the touch data from optical, surface acoustic wave, or force sensors. In this embodiment, when the secondary capacitive sensor is touched by a grounded conductor such as a finger, the resulting current flow indicates a valid touch detection by the primary sensor.

In contrast, a false touch due to either a contaminant (e.g., surface acoustic wave or optical sensors) or a shock or vibration (e.g., force-based touch system) does not result in a coincident current flow in the capacitive secondary sensor, thus invalidating the data from the primary sensor. The secondary capacitive sensor may be a simple discrete sensor such as that provided by a single-contact transparent conductive coating or a more complex capacitive sensor capable of providing touch coordinates for comparison purposes.

In another embodiment of the invention, one in which no touch panel is overlaid on the face of a CRT monitor (e.g., infrared optical system, on-tube surface acoustic wave system, or a non-overlay differential force system), the secondary capacitive sensor is comprised of a resistive coating on the surface of the CRT. A resistive coating of this type may be used to limit charge build-up on the CRT screen. The capacitive sensor of this embodiment utilizes the resistive coating in combination with a current monitoring circuit that measures the amplitude of the electromagnetic noise signal coupled to the resistive coating. In use, when the screen is touched by a grounded object such as a finger, the detected signal amplitude change exceeds a preset threshold thus indicating a valid touch. In contrast, when an ungrounded object such as a contaminant touches the surface, the detected signal amplitude change does not exceed the preset threshold and the touch is invalidated.

In another embodiment of the invention, a secondary sensor such as a force sensor or a capacitive sensor is used as a means of adding tactile feel to an IR optical sensor based touchscreen. In this embodiment the secondary sensor system is used to determine when the user has made physical contact with the touchscreen. Until actual contact is made, the IR system will not register a touch, thus eliminating false touches that may arise due to the user or an article of the user's clothing interrupting the IR beam grid. In addition, the secondary sensor system can be used when the system is in a sleep mode, thus eliminating the continuous power drain associated with the IR system.

A further understanding of the nature and advantages of the present invention may be realized by reference to the remaining portions of the specification and the drawings.

DESCRIPTION OF THE SPECIFIC EMBODIMENTS

Figure 1:
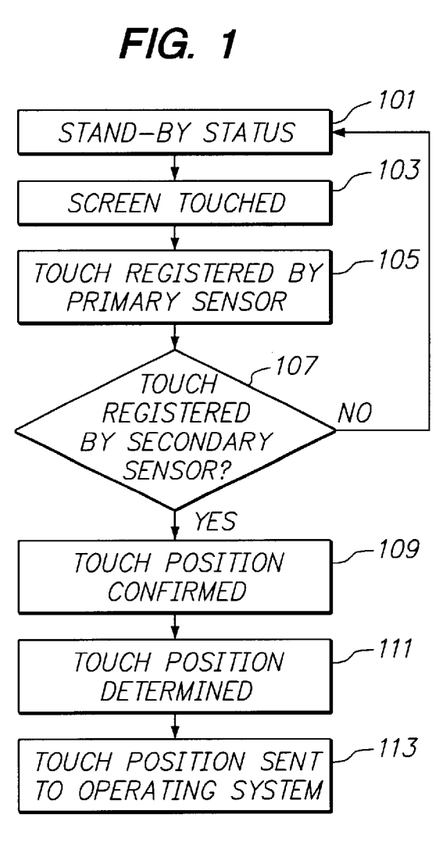
FIG. 1 is a flow chart illustrating the basic methodology of the present invention.

FIG. 1 is a flow chart illustrating the preferred operation of the present invention. At step 101, the touchscreen is in a pre-touch, stand-by status. The screen then receives a touch (step 103), for example via a finger, stylus, or other means. The primary touch sensor then registers a touch (step 105). The sensor used in step 105 can be of any type, for example, resistive, capacitive, surface acoustic wave, infrared, or force. Prior to the primary touch sensor determining the coordinates of the touch or sending any information to the operating system (e.g., touch position, touch mode, etc.), a secondary sensor confirms that the touch received by the primary sensor is a valid touch (step 107). If the secondary sensor confirms that the touch is valid (step 109), the touch position is determined (step 111). Depending upon the desired configuration, the touch position can be determined by either the primary sensor or the secondary sensor. The touch controller then sends the touch information to the operating system (step 113). If the secondary sensor does not confirm that a valid touch was received by the primary sensor, no touch information is sent to the operating system and the touch sensor is placed back into stand-by status 101. The benefit of this embodiment is that time is not spent on determining invalid touch positions, thus enabling the system to quickly confirm that a valid touch has been received and if the touch is invalidated, to quickly return to stand-by status 101.

Figure 2:
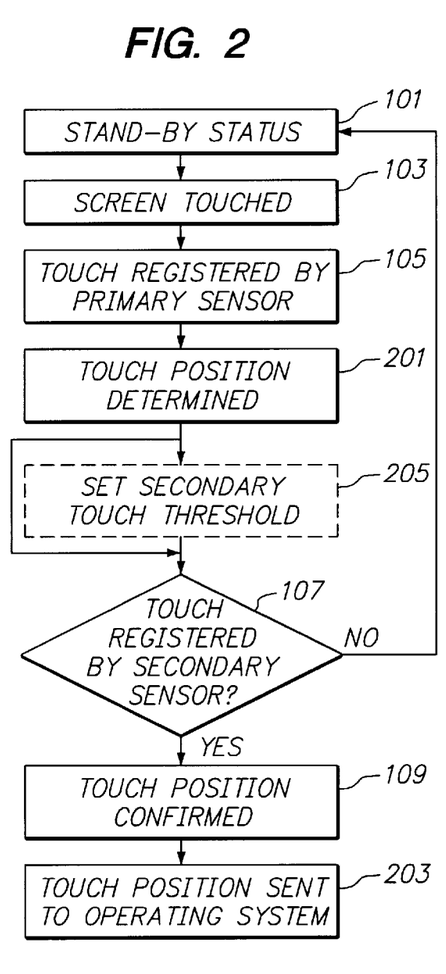
FIG. 2 is a flow chart illustrating an alternate methodology of the present invention.

In a slight modification of the system illustrated in FIG. 2, after the primary sensor registers a touch (step 105), it determines the position of the touch (step 201). After determining touch position, the system can simply query the secondary sensor to determine it has also registered a touch (step 107) and if it has, confirm the touch (step 109) and send the position coordinates to the operating system (step 203). Alternately, after the touch position has been determined (step 201), a coordinate dependent touch threshold is set for the secondary sensor (step 205), thus accounting for coordinate dependent touch sensitivities.

In the preferred embodiment of the invention, one of the sensors, preferably the secondary sensor, only determines whether or not a touch has been received. Since this sensor does not determine absolute touch position, it can be an inexpensive sensor. Alternately, this sensor is designed to determine approximate touch position. For example, this sensor can be designed to determine what quadrant of the screen has been touched. Alternately, the complimentary information received from the two sensors is used to refine the received touch information. For example, the information received from the first sensor can be used to adjust the touch threshold of the second sensor.

Figure 3:
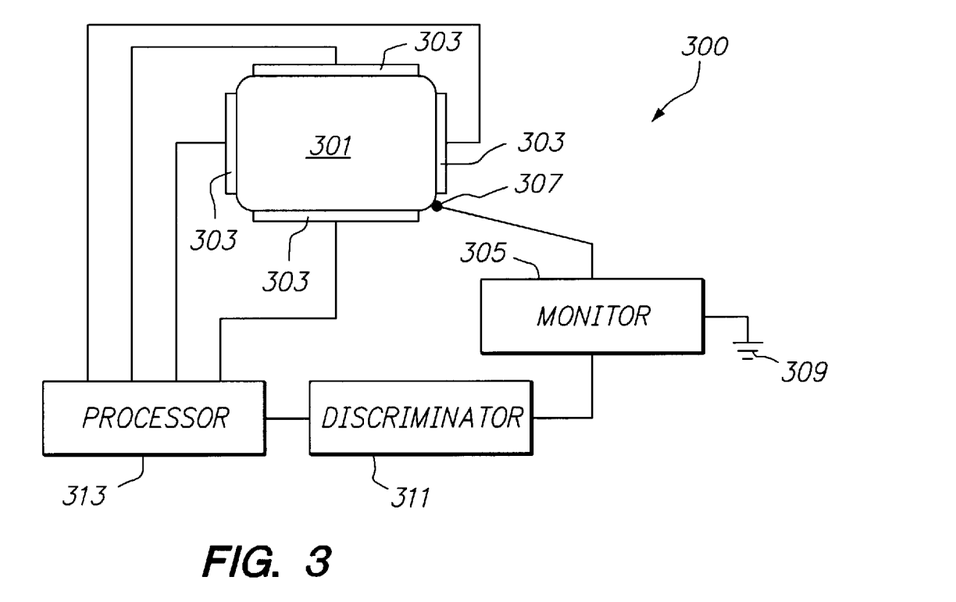
FIG. 3 is an illustration of an embodiment of the present invention utilizing a simple capacitive false touch sensor in conjunction with either an infrared or a surface acoustic wave sensor.
Figure 4:
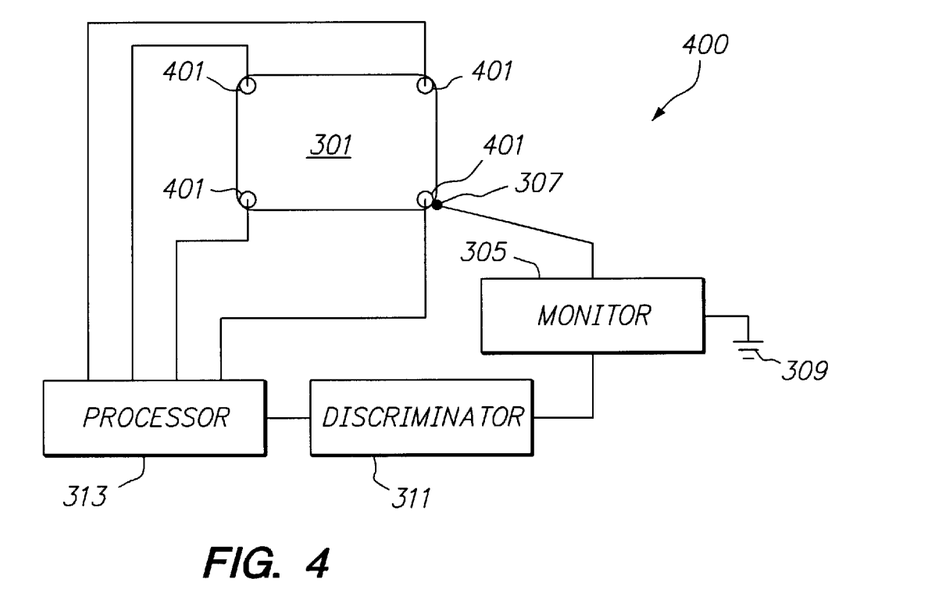
FIG. 4 is an illustration of an alternative embodiment to that shown in FIG. 3 utilizing a simple capacitive false touch sensor in conjunction with a non-overlay differential force sensor.

FIGS. 3 and 4 illustrate two configurations of an embodiment of a false touch discrimination touchscreen system according to the present invention. In both configurations the front surface of a display 301 (e.g., a CRT screen) includes a resistive coating. The coating may be of the type that is commonly deposited on CRT screens to limit charge build-up, for example, an ITO coating. The primary touch sensor can be any of a variety of different touch screens although it is preferably a surface acoustic wave (i.e., SAW) sensor such as that disclosed in U.S. Pat. Nos. 5,708,461, a non-overlay differential force sensor such as that disclosed in U.S. Pat. No. 5,038,142, or an infrared touch sensor such as that disclosed in U.S. Pat. No. 5,164,714, the disclosures of which are incorporated herein for all purposes.

FIG. 3 shows a touchscreen system 300 in which the primary sensor is either a SAW sensor or an infrared sensor. In this embodiment screen 301 includes a plurality of emitter/receivers 303 along the periphery of the front surface of the display screen, emitter/receivers 303 designed for use with either a SAW sensor or an infrared sensor. In the alternative configuration shown in FIG. 4, the primary sensor of touchscreen system 400 utilizes a non-overlay differential force sensor system with four force measuring gauges 401, one at each corner of screen 301.

To provide the secondary or false touch sensor in touchscreen systems 300 and 400, the resistive coating on screen 301 is coupled to an electric field monitor 305, preferably via an electrode 307. Electrode 307 can be positioned behind a monitor cowling, thus hiding the connection from view by the user. When the CRT is in use, a field is generated by the anode supply of the CRT, thereby causing electromagnetic noise. Capacitive coupling of the high voltage anode ripple to the resistive coating of screen 301 contributes to this signal. Monitor 305 measures the voltage difference between the resistive coating and a ground 309 that corresponds to the CRT's ground.

In use, when a finger or other grounded object touches CRT front screen 301 (i.e., the resistive coating), the amplitude of the signal observed by monitor 305 changes. Monitor 305 is coupled to a discriminator 311 that determines when a change in the detected signal amplitude is greater than a preset threshold, thus indicating that a touch has occurred. Thus discriminator 311 distinguishes between grounded objects such as a user's finger and ungrounded objects such as a water droplet.

Discriminator 311 and the primary touch sensor are coupled to a common processing system 313. System 313 compares the response from the primary touch screen with the false touch sensor. Thus if system 313 determines that a touch was observed by the primary sensor but was not verified by the secondary or false touch sensor, the touch is nullified. For example in system 300, if a drop of water hits screen 301, the SAW or infrared primary sensor would indicate a touch. This touch, however, would not be verified by the false touch sensor as the water drop is ungrounded. Similarly, in system 400 where the primary sensor employs non-overlay differential force technology, a physical shock to the CRT would register a touch, but this touch would not be verified because there would be no grounding of the secondary sensor. In either system 300 or 400, if processor 313 determines that a touch was registered by both the primary sensor and the false touch sensor, the touch is validated.

It should be understood that although the examples provided above assume that a valid touch is one in which the false touch sensor is touched by a grounded object, e.g., a finger, a valid touch can also be defined as one in which the detected signal amplitude is less than a preset threshold. For example, in a medical laboratory it may be desirable to require lab technicians to wear rubber gloves, thereby minimizing the risk of contamination. Using the present invention, the false touch sensor can be designed to invalidate any touch in which the detected signal amplitude exceeds the preset threshold, thus indicating that the user is not wearing rubber gloves. Therefore in this application of the invention, the absence of a signal indicating that the detected signal amplitude has exceeded the preset threshold validates the touch from the primary touch sensor.

Figure 5:
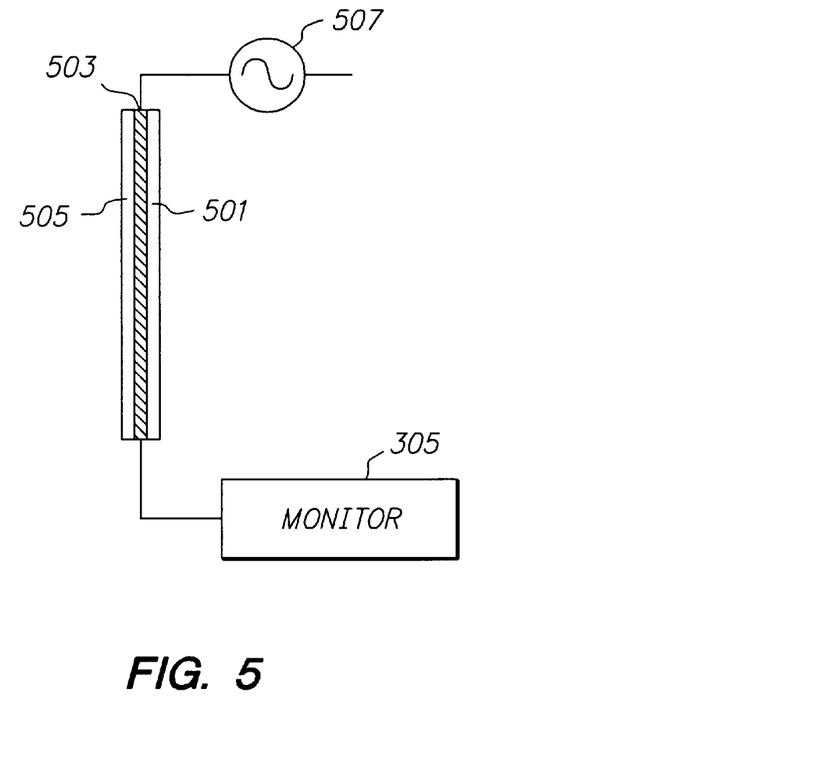
FIG. 5 is a cross-sectional view of a capacitive touch sensor.

In another embodiment similar to that shown in FIGS. 3 and 4, as opposed to relying on the charge limiting coating on a CRT screen as the secondary sensor, a screen overlay is used. In this embodiment, capacitive touch technology, as illustrated in FIG. 5, forms the basis of the secondary sensor. As in the previous embodiments, the primary sensor can utilize SAW sensors, infrared sensors, or differential force sensors. The differential force sensors, however, can either be overlay or non-overlay force sensors.

FIG. 5 is a cross-sectional view of a capacitive touch sensor, such as that disclosed in U.S. Pat. No. 5,457,289, the disclosure of which is incorporated herein for all purposes. An overlay substrate 501 is used that can be incorporated into a CRT or other touch panel. A transparent conductive coating 503 (e.g., ITO coating) is deposited onto substrate 501 with a protective overlay coating 505 (e.g., $SiO_2$ coating). Transparent conductive coating 503 can either be excited by electromagnetic noise, as in the resistive coating of CRT screen 301, or by an external frequency source 507.

As in the embodiment illustrated in FIGS. 3 and 4, this embodiment utilizing an overlay capacitive sensor as the secondary sensor is coupled to processor 313 (not shown) via discriminator 311 (not shown) and monitor 305 (shown). The monitoring/discriminator system then determines whether or not a touch received by the primary sensor is valid, i.e., due to a grounded signal from a finger or equivalent object. Therefore, as in the previous embodiment, a touch due to a contaminant received by a SAW or infrared primary sensor, or a shock to a system utilizing a force-based primary sensor, will not be reported to the operating system since the capacitive secondary sensor would not detect a corresponding touch by an ungrounded object.

In this embodiment of the invention, the capacitive secondary sensor can either provide simple touch validation, similar to that provided by the charge limiting resistive coating described in reference to FIGS. 3 and 4, or it can provide touch coordinates that can be compared by processor 313 with the coordinates determined by the primary sensor. In the latter case, the capacitive secondary sensor is fabricated using well known techniques, such as those disclosed in U.S. Pat. No. 5,457,289.

In another embodiment of the invention, force sensors are used as the secondary sensor. Techniques for fabricating force sensors are well known by those of skill in the art and are typified by a temperature compensated strain gauge such as that disclosed in U.S. Pat. No. 5,742,222.

Figure 6:
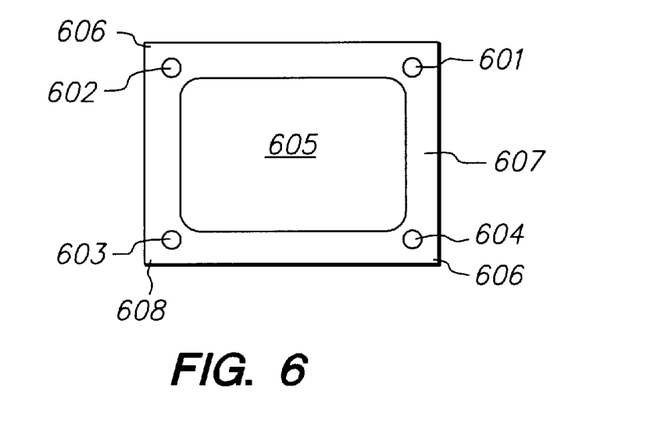
FIG. 6 is an illustration of one or more force sensors mounted to a touchscreen.

As shown in FIG. 6, in the simplest configuration of this embodiment a single force sensor 601 is located on a touchscreen 605. In the case of a single force sensor, low-stiffness supports at corners 606 and a high-stiffness support at corner 608 may be used to avoid zones of limited or no touch sensitivity. Preferably sensor 601 is located just outside of the viewing region of screen 605 and underneath a touchscreen cowling 607. Alternately, four force sensors 601–604 may be used, one located at each corner of touchscreen 605, to provide touch coordinates in a manner similar to that disclosed in U.S. Pat. No. 5,708,460, the disclosure of which is incorporated herein for all purposes.

Figure 7:
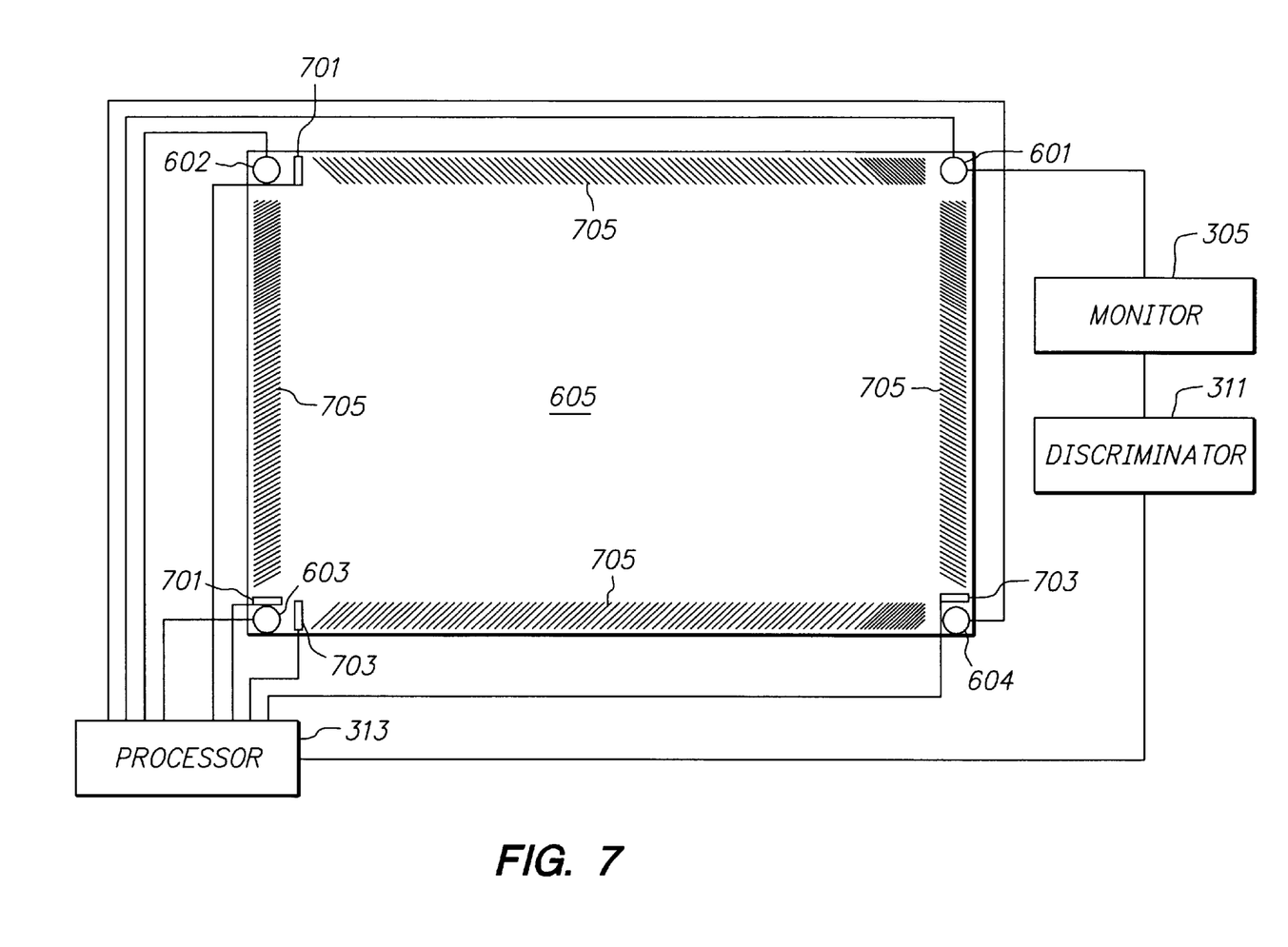
FIG. 7 is an illustration of an embodiment of the present invention utilizing a surface acoustic wave sensor as the primary sensor and one or more force sensors as the secondary sensor.
Figure 8:
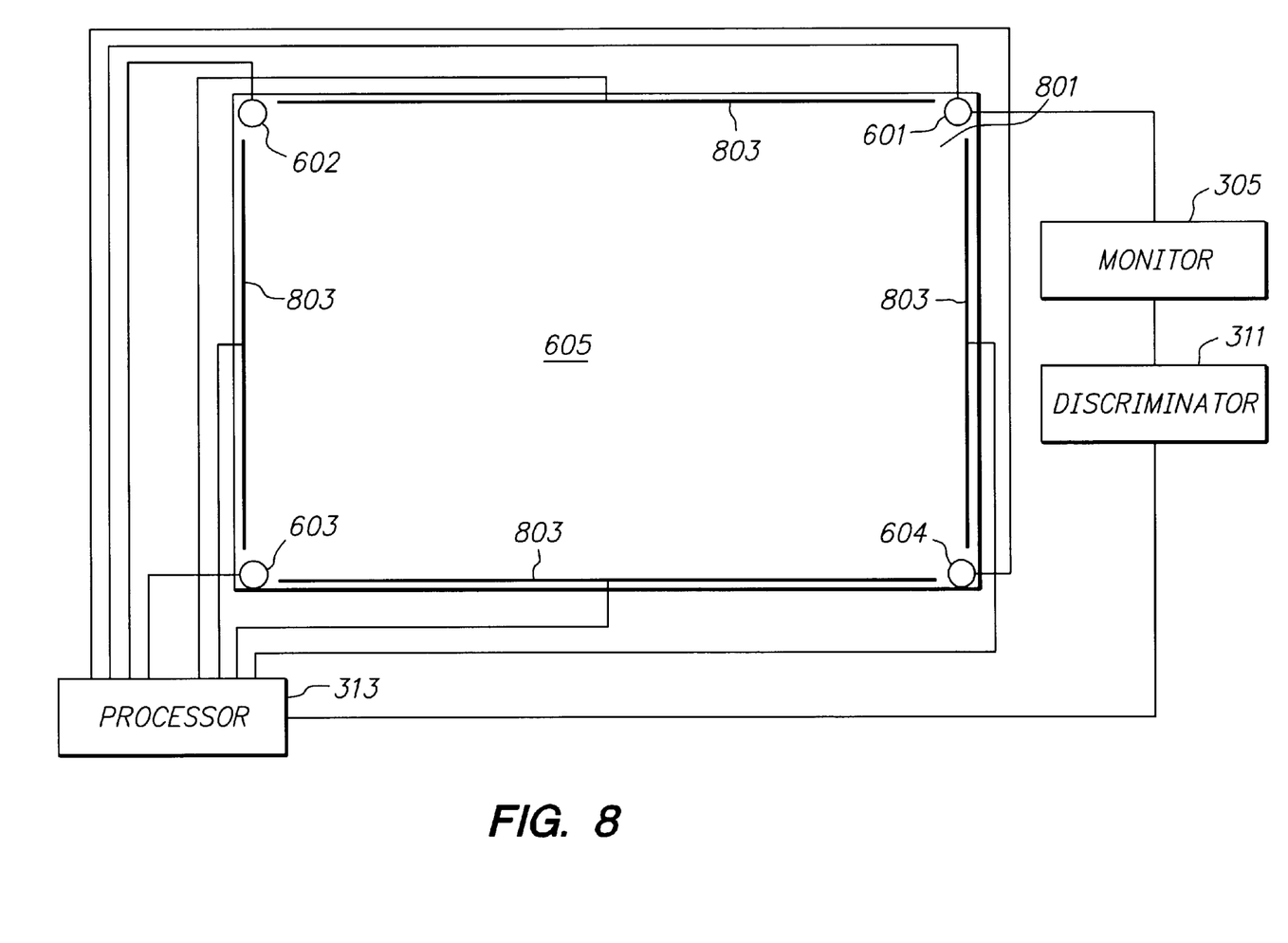
FIG. 8 is an illustration of an embodiment of the present invention utilizing a capacitive sensor as the primary sensor and one or more force sensors as the secondary sensor.

In this embodiment of the invention, the force sensor is the secondary sensor while the primary sensor is either an overlay utilizing a SAW sensor as illustrated in FIG. 7 or a capacitive touch sensor as illustrated in FIG. 8. In both FIGS. 7 and 8 multiple force sensors 60–604 are shown although it is understood that a single force sensor 601 could be used to provide touch validation. Therefore as shown in FIGS. 7 and 8, the output of sensor 601 can either be coupled to monitor 305 and discriminator 311 to provide touch validation or directly coupled to processor 313 along with the outputs from force sensors 602–604 to provide secondary touch coordinate determination.

As shown in FIG. 7, the primary sensor includes transmitter transducers 701, receiver transducers 703, and reflective grids 705. The capacitive primary sensor shown in FIG. 8 includes a conductive coating 801 on screen 605 as well as electrode assemblies 803. If a contaminant causes the primary sensor of FIG. 7 to detect an apparent touch, or if an inadvertent grounding causes the capacitive primary sensor of FIG. 8 to detect an apparent touch, the lack of a corresponding pressure signal from force sensor 601 would preclude the system from reporting the coordinates of the false touch.

Figure 9:
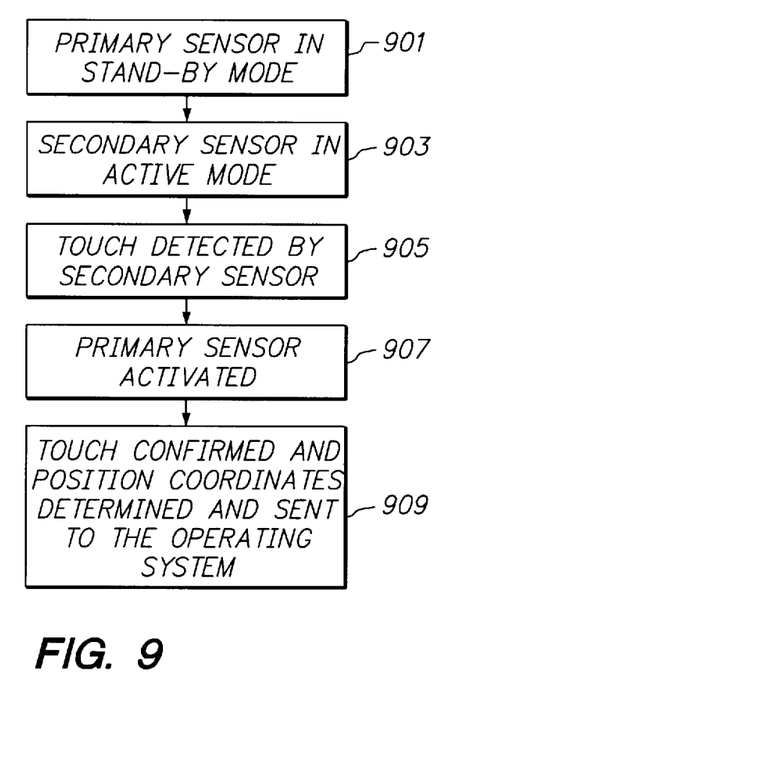
FIG. 9 is a flow chart illustrating the system wake-up feature according to the present invention.

Besides overcoming the deficiencies of individual sensor systems, the combination of sensors of the present invention has other advantages. For example, in the system stand-by mode, only one of the sensor systems needs to be in the 'ready' state. Thus the other sensor system can be in a completely unpowered state, thereby reducing power consumption. In the preferred embodiment as illustrated in FIG. 9, initially the primary sensor is in a stand-by mode (step 901) while the secondary sensor remains in an active mode (step 903). When a touch is detected by the secondary sensor (step 905), the primary sensor is activated (step 907). The system then determines the touch position coordinates according to one of the previously described algorithms shown in FIGS. 1 and 2 (step 909).

In another application of force technology being employed as the secondary sensor, a force sensing system that measures the pressure applied to the surface of the display, such as the differential force sensing system disclosed in U.S. Pat. No. 5,038,142, may be used in conjunction with a primary sensor of a non-overlay on-screen surface acoustic wave sensor or a non-overlay on-screen capacitive sensor similar to that disclosed in U.S. Pat. No. 5,796,389.

In yet another application of force technology employed as the secondary sensor, a force sensing system is used in conjunction with an IR optical sensor as illustrated in FIGS. 10–14. In a typical IR sensor based touchscreen, touch is sensed when an IR beam grid positioned directly above the touchscreen surface is interrupted. As such, the user does not actually have to touch the screen in order to activate a touch button or otherwise interact with the touchscreen. Unfortunately the ability to interact with the screen without physically touching the screen is counterintuitive to most users, often leading to false touches. For example, a tentative user may allow his or her finger to hover just above the touchscreen surface while decided which touch button to activate. If the user's finger is too close to the screen during this decision-making period, a false touch will occur.

In accordance with the present invention, in order to overcome the lack of tactile feel for an optical sensor based touchscreen system one or more force sensors are used, thereby providing positive touch feedback to the user. It should be understood, however, that the simple capacitive sensor system described in relation to FIG. 3 (i.e., using the charge limiting coating on a CRT screen) or FIG. 5 (i.e., using a screen overlay) can also be used in conjunction with an optical sensor based touchscreen system to provide positive touch feedback (i.e., tactile feel). Thus the previously described systems utilizing a capacitive secondary sensor system would overcome the tactile feel limitations of an IR optical sensor system. Therefore the use of force sensors in the following examples is only meant to be illustrative of the invention, not limiting, as it is understood that a capacitive sensor system can also be used to augment the optical sensor system.

Figure 10:
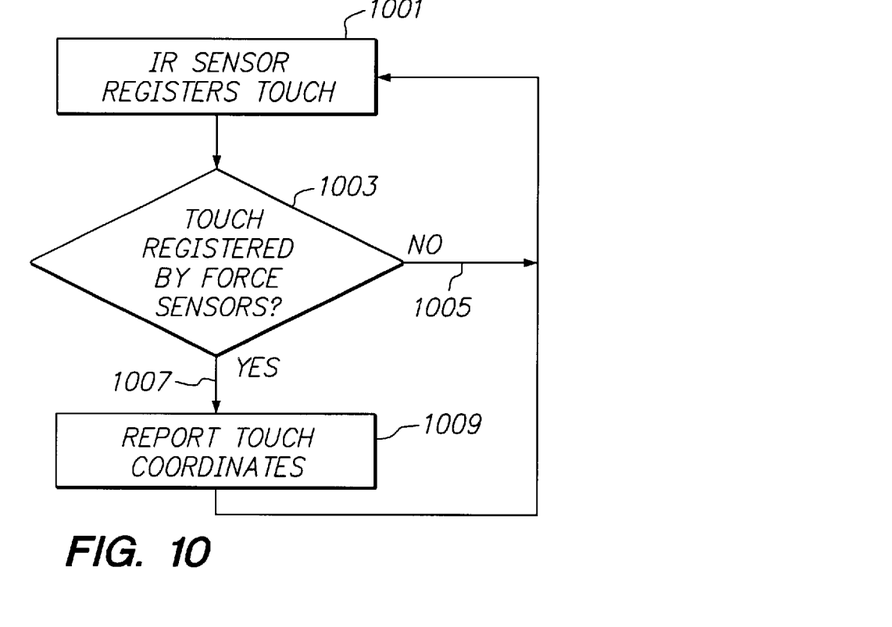
FIG. 10 is a flow chart illustrating the methodology associated with an embodiment of the invention utilizing a force sensor system in conjunction with an IR optical sensor system.

As illustrated in FIG. 10, when the optical sensor registers a touch (step 1001) the force sensor system is queried to determine if it has also registered a touch (step 1003). If no touch is registered by the force sensor system (step 1005), a false touch is assumed and the system does not report a touch to the host computer. Alternately, if a touch is registered by the force sensor system (step 1007), the touch is verified and the touch coordinates are reported to the host computer (step 1009). It should be understood that in this embodiment the force sensor system is not being used to provide and/or verify touch position coordinates. Rather, the force sensor system is only being used to discriminate between valid and false touches.

Besides providing touch confirmation, the force sensor system of the present invention also provides additional design flexibility to the touchscreen designer. In a typical optical sensor system, the beam grid is placed as close as possible to the touch surface, thereby minimizing the lack of a tactile feel provided by such a sensor system. Utilizing the present invention, however, the system designer can locate the beam grid further away from the touch surface, thus allowing other aspects of the system to be optimized. For example, by allowing the beam grid to be positioned further from the touch surface, it is easier to design a system that allows rainwater drainage from the touchscreen.

Figure 11:
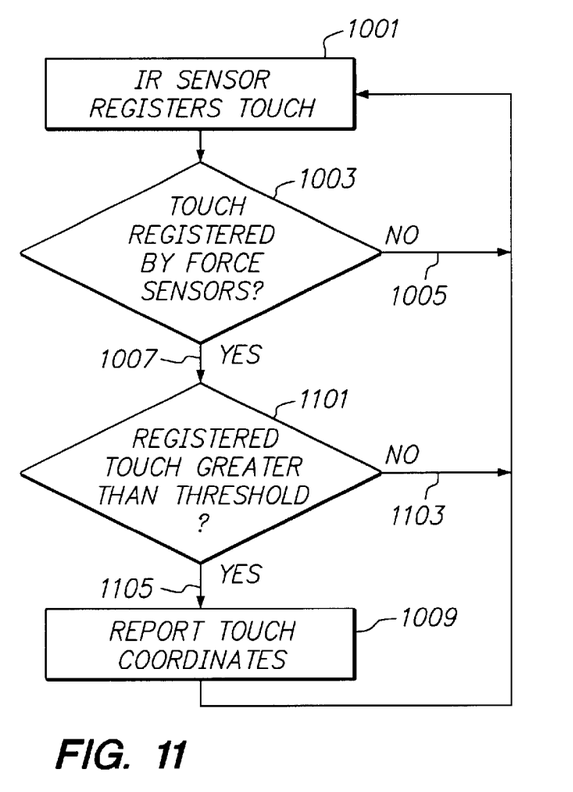
FIG. 11 is a flow chart illustrating an alternate methodology associated with an embodiment of the invention utilizing a force sensor system in conjunction with an IR optical sensor system.

FIG. 11 illustrates a variation of the approach shown in FIG. 10 that is specific to the embodiment of the invention utilizing force sensors as the secondary sensor (as opposed to a capacitive secondary sensor system). In this approach not only is the force sensor queried to determine whether or not a touch has been registered (step 1003), but also the amount of force in the touch is determined (step 1101). If the applied force does not exceed a preset threshold (step 1103), the touch is rejected as a false touch and no touch coordinates are reported to the host system. Alternately if the touch force exceeds the threshold (step 1105), the touch coordinates are reported to the host system (step 1009). The benefit of this approach is that a false touch, for example due to an article of the user's clothing resting on the touchscreen, will not be reported to the host system as a valid touch.

It should be understood that the sensitivity of the force sensor system of the present embodiment typically exhibits a positional dependency which, if not accounted for, can affect force threshold step 1101. In part, this dependency is due to the selected sensor locations and to the variations in panel flexure as the touch location moves from panel edge to panel center. Although the positional dependency can be minimized (e.g., through sensor selection, sensor location, panel selection, panel mounting, etc.), preferably the variations are calculated thus allowing a constant effective touch force sensitivity throughout the touch zone to be maintained.

Figure 12:
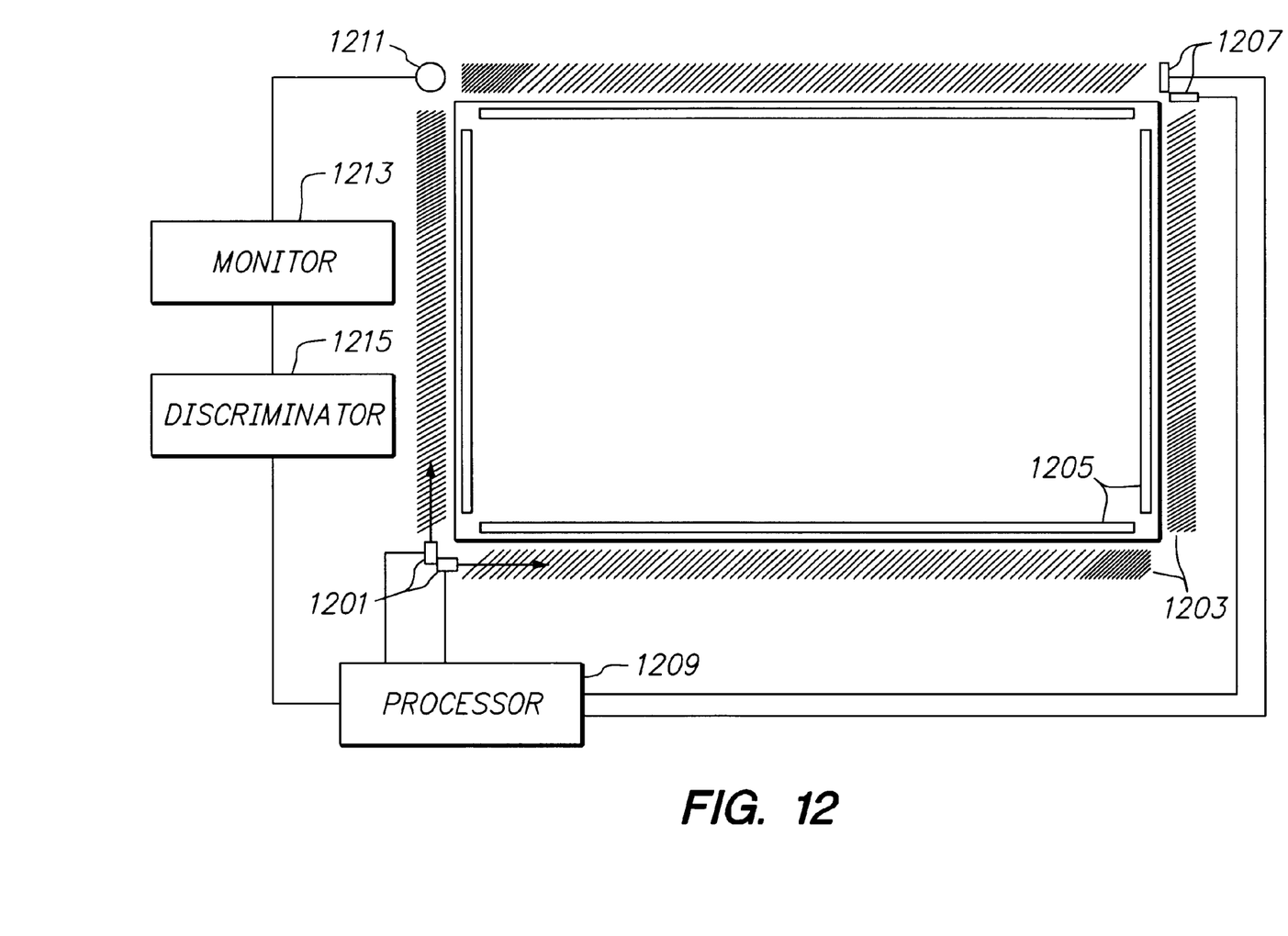
FIG. 12 is an illustration of an embodiment of the invention utilizing an IR optical sensor system as the primary sensor and a force sensor system as the secondary sensor.

FIG. 12 is an illustration of a touchscreen utilizing an IR optical sensor system as the primary sensor and a force sensor system as the secondary sensor for use with the previously described methodologies. IR optical sensor systems are well known by those of skill in the art and will therefore not be described in detail herein. For example, see PCT Patent Application WO 98/40844. The primary optical components include IR sources 1201, waveguide or other beam dispersive means 1203 for forming the beam grid, cylindrical lenses 1205, and detectors 1207. A processor 1209 controls the touchscreen system. According to the invention, one or more force sensors 1211 are also coupled to the touchscreen. A variety of different types of force sensor can be used with the invention. The output of force sensor 1211 is coupled to a monitor 1213 that determines when a touch is registered. The functions of monitor 1213 can be separate from, or performed by, processor 1209. If desired, a discriminator circuit 1215 can be used to determine whether or not the force applied to the touchscreen exceeds a preset threshold.

In one variation of the optical sensor/force sensor based embodiment of the invention suited for use with the LCD display of a laptop computer, a thin piece of glass (e.g., 2 millimeters thick) is placed over the LCD display. Not only does this piece of glass provide a surface for mounting or bonding the IR optical system components, it also provides a touch plate for the force system. Additionally it mechanically protects the LCD display from the wear associated with touch operation. In this embodiment, the thickness of the glass substrate is selected to provide sufficient rigidity so that the substrate flexure resulting from touching the surface will cause only a slight misalignment of the optical system. Preferably the optical system is designed such that the angular acceptance of the cylindrical lenses compensates for the substrate flexure. In this embodiment preferably the force sensors are a pair of PVDF thin film piezoelectric strain gauges bonded to the back surface of the substrate outside of the viewing area of the LCD (e.g., beneath waveguide structures 1203), one mounted along either axis of the touchscreen. As the substrate flexes, a signal that is proportional to the change in local curvature is generated, thus providing a means of detecting touch.

Figure 13:
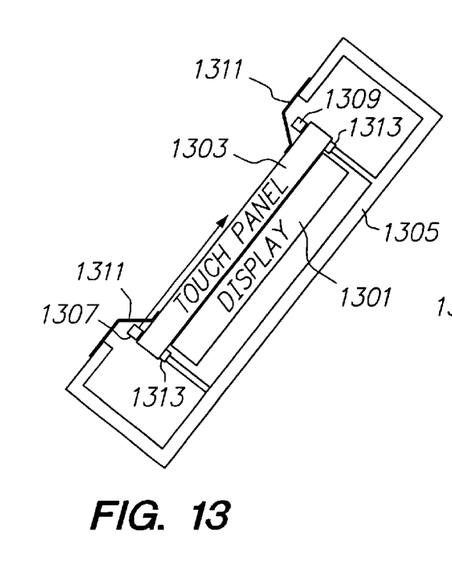
FIG. 13 is a cross-sectional view of a variation of the optical sensor/force sensor based embodiment of the invention.
Figure 14:
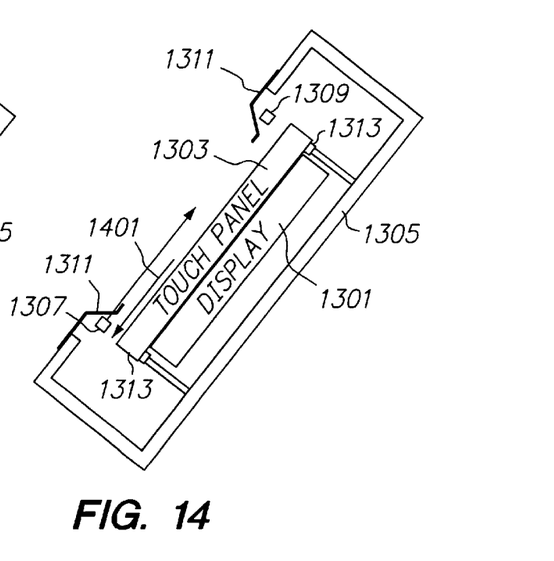
FIG. 14 is a cross-sectional view of an alternate variation of the optical sensor/force sensor based embodiment of the invention.

FIGS. 13 and 14 are cross-sectional views of a pair of variations of the optical sensor/force sensor based embodiment of the invention utilizing a thick substrate, thus providing better protection for the underlying display. Due to the additional weight of the thicker substrate, however, this embodiment is better suited for a kiosk than a laptop computer. As shown, the display arrangements are tilted in a manner similar to that used in a typical kiosk. It is understood, however, that the display arrangement can be tilted at any angle from 0 degrees (i.e., horizontal) to 90 degrees (i.e., vertical).

In the embodiments illustrated in FIGS. 13 and 14, the system includes a display (e.g., LCD display) 1301, a glass touch panel 1303, and a mounting structure 1305. In these illustrations, the IR optical system is represented simply by a source 1307 and a detector 1309 although it is understood that other optical components are typically required (e.g., waveguide structures, lenses, etc.). Generally an IR transparent bezel 1311 is used to protect the components of the optical sensor system. Due to the thickness of the glass in these embodiments, touch panel 1303 can be expected to undergo very little flexure during touch. Thus instead of strain gauges, the force sensor system uses one or more pressure sensors 1313 that are mounted between touch panel 1403 and mounting structure 1305. In the embodiment illustrated in FIG. 14, transparent bezel 1311 and IR optical sensor components 1307 and 1309 are elevated from panel 1303, thus allowing the system to be designed with drainage channels for rainwater runoff 1401. As previously noted, in a conventional optical sensor based touchscreen (i.e., one which does not include a secondary sensor system) such an elevated optical system would be undesirable as the increased elevation would further emphasize the lack of tactile feel.

Another advantage of the present invention is that it provides a true "sleep" mode for the combined system. In a typical resistive touchscreen system, during periods of inactivity the system is placed in a sleep mode. In this mode the system basically operates as a simple membrane switch. Thus once the touchscreen enters this mode, generally the first touch simply wakes up the system, preparing it for accepting information through further user touchscreen interactions. For example, in a laptop computer using a resistive touchscreen, if no touch is registered for a preset period of time, the system enters the sleep mode and minimizes system power usage (e.g., eliminating the screen display, eliminating rotation of the CD drive, etc.) thereby extending battery life. Unfortunately a touchscreen that only uses an optical or acoustic or capacitive sensor must continue to expend power in order to remain responsive to touch. For example, an optical sensor system must continue to scan the IR beams across the active touch region in order to respond to a touch. Therefore a touchscreen based solely on optical, acoustic, or capacitive sensors that is in a legitimate sleep mode, i.e., a mode in which no power is being consumed, becomes completely dead to the touch and thus cannot be used to wake or initialize the system upon a first touch.

Figure 15:
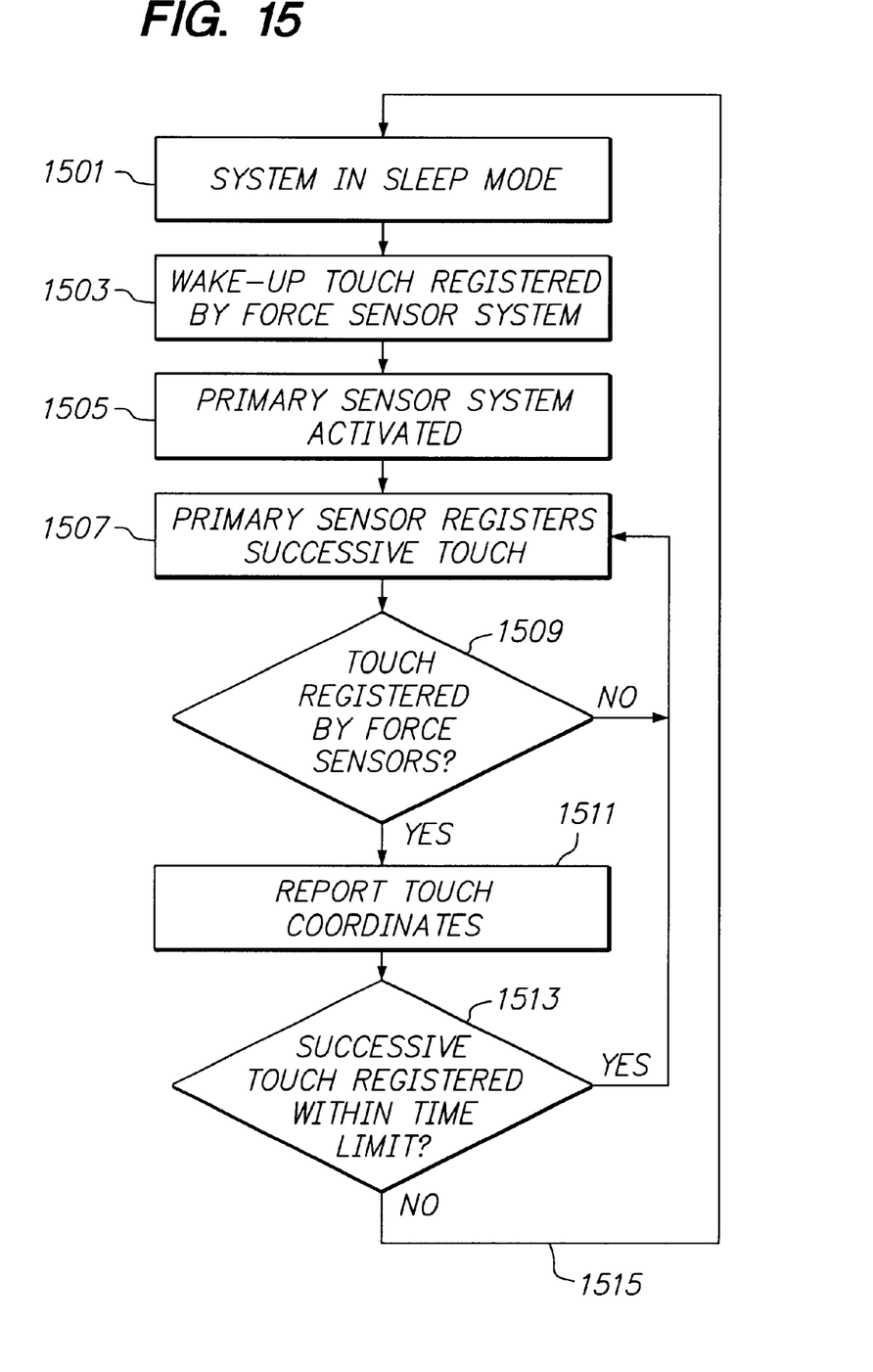
FIG. 15 is a flow chart illustrating the use of a force sensor to provide a legitimate sleep mode.

The present invention overcomes this problem through the use of the force sensor system. As illustrated in FIG. 15, initially or after a period of nonuse, the system enters into a sleep mode (step 1501). According to the invention, in this mode the primary sensor system (i.e., the optical, acoustic, or capacitive system) is in a complete power-down mode. When a user attempts to use the touchscreen by touching the touchscreen panel, the touch is detected by the force sensor system (step 1503). Once a touch has been detected, the primary sensor system is activated (step 1505). After this step, the system works as previously described, registering each successive touch with the primary sensor system (step 1507), verifying the touch with the force sensor system (step 1509), and reporting the coordinates of each verified step to the host computer (step 1511). Preferably the system monitors the time between successive touches (step 1513) and if the time exceeds a preset time limit (step 1515) it re-enters the system sleep mode. The system may or may not use a touch force threshold as described with reference to FIG. 11.

In should be understood that the use of multiple touch sensors typically does not require multiple sets of electronics since much of the electronics associated with a touchscreen controller is independent of the type of detector. For example, a typical touchscreen controller requires a microprocessor, RAM, ROM, an analog-to-digital converter (ADC), power supply circuitry, digital circuits to support communication with the host computer, and a printed circuit board. Thus in many cases much of the electronics associated with the touchscreen can be used to support multiple sensor systems.

In some instances, other aspects of the controller electronics may be common to two different types of sensors. For example, some types of piezoresistive force sensors can be read out with an alternating-current excitation voltage in the tens of kiloHertz range as opposed to the more typical approach of using a direct-current excitation voltage. Therefore the same excitation frequency and similar receive electronics can be used for both force sensors and capacitive sense electrodes.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of initializing a primary touchscreen sensor system, the method comprising the steps of:
   registering a first touch with a force sensor system;
   initializing the primary touchscreen sensor system;
   registering a subsequent touch with the primary touchscreen sensor system;
   confirming whether said registered touch is a valid touch with said force sensor system, wherein said force sensor system is incapable of determining a set of touch coordinates;
   determining said set of touch coordinates with said primary touchscreen sensor system for said confirmed, validated touches; and
   transmitting said set of touch coordinates to an operating system.

2. The method of claim 1, wherein said primary touchscreen sensor system is selected from the group consisting of IR optical sensor systems, acoustic sensor systems, and capacitive sensor systems.

3. A touchscreen system, comprising:
   a first sensor system coupled to a touchscreen, said first sensor system selected from the group consisting of surface acoustic wave sensors, infrared sensors, and capacitive sensors, wherein said first sensor system determines a first set of position coordinates for each touch of said touchscreen; and
   a second sensor system coupled to said touchscreen, said second sensor comprising a force sensor system, wherein said second sensor system determines a second set of position coordinates for each touch of said touchscreen; and
   a processor coupled to said first and second sensor systems, wherein said processor compares said first set of position coordinates to said second set of position coordinates to determine if said first set of position coordinates varies by more than a predetermined amount from said second set of position coordinates, wherein said processor confirms each touch of said touchscreen when said first set of position coordinates varies from said second set of position coordinates by less than said predetermined amount, and wherein said processor invalidates each touch of said touchscreen when said first set of position coordinates varies from said second set of position coordinates by more than said predetermined amount.

4. The touchscreen system of claim 3, herein said second sensor system approximates said second set of position coordinates.

5. The touchscreen system of claim 4, wherein said second sensor system determines said second set of position coordinates to within a quadrant of said touchscreen, and wherein said predetermined amount requires that said first set of position coordinates and said second set of position coordinates be within the same quadrant of said touchscreen.

6. A touchscreen system, comprising:
   a first sensor system coupled to a touchscreen, said first sensor system selected from the group consisting of surface acoustic wave sensors, infrared sensors, and force sensors, wherein said first sensor system determines a first set of position coordinates for each touch of said touchscreen; and
   a second sensor system coupled to said touchscreen, said second sensor comprising a capacitive sensor system, wherein said second sensor system determines a second set of position coordinates for each touch of said touchscreen; and
   a processor coupled to said first and second sensor systems, wherein said processor compares said first set of position coordinates to said second set of position coordinates to determine if said first set of position coordinates varies by more than a predetermined amount from said second set of position coordinates, wherein said processor confirms each touch of said touchscreen when said first set of position coordinates varies from said second set of position coordinates by less than said predetermined amount, and wherein said processor invalidates each touch of said touchscreen when said first set of position coordinates varies from said second set of position coordinates by more than said predetermined amount.

7. The touchscreen system of claim 6, wherein said second sensor system approximates said second set of position coordinates.

8. The touchscreen system of claim 6, wherein said second sensor system determines said second set of position coordinates to within a quadrant of said touchscreen, and wherein said predetermined amount requires that said first set of position coordinates and said second set of position coordinates be within the same quadrant of said touchscreen.

* * * * *